Aug. 4, 1931.  J. O'CONNELL ET AL  1,817,833
CHURN
Filed Dec. 17, 1927
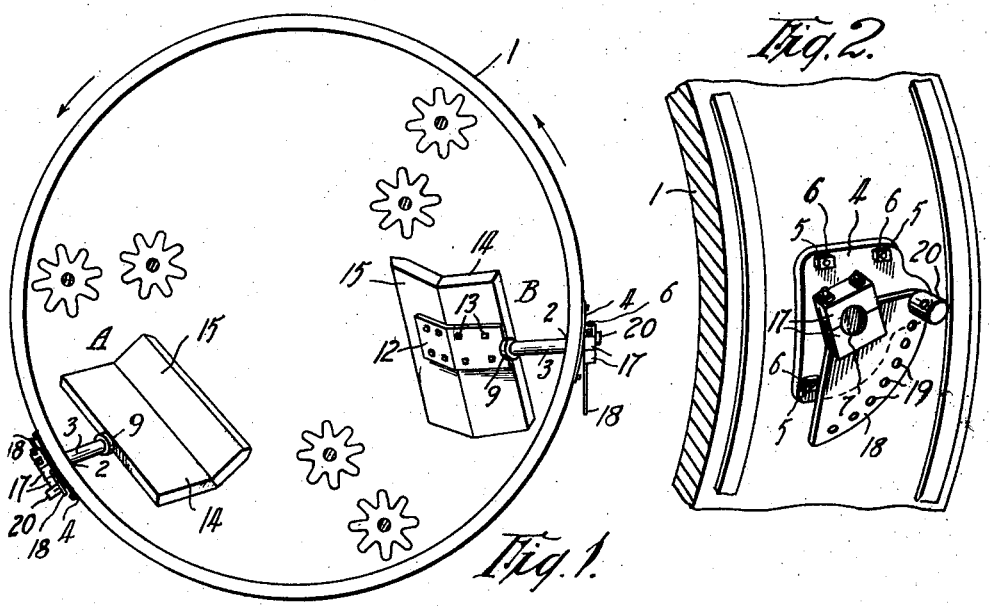
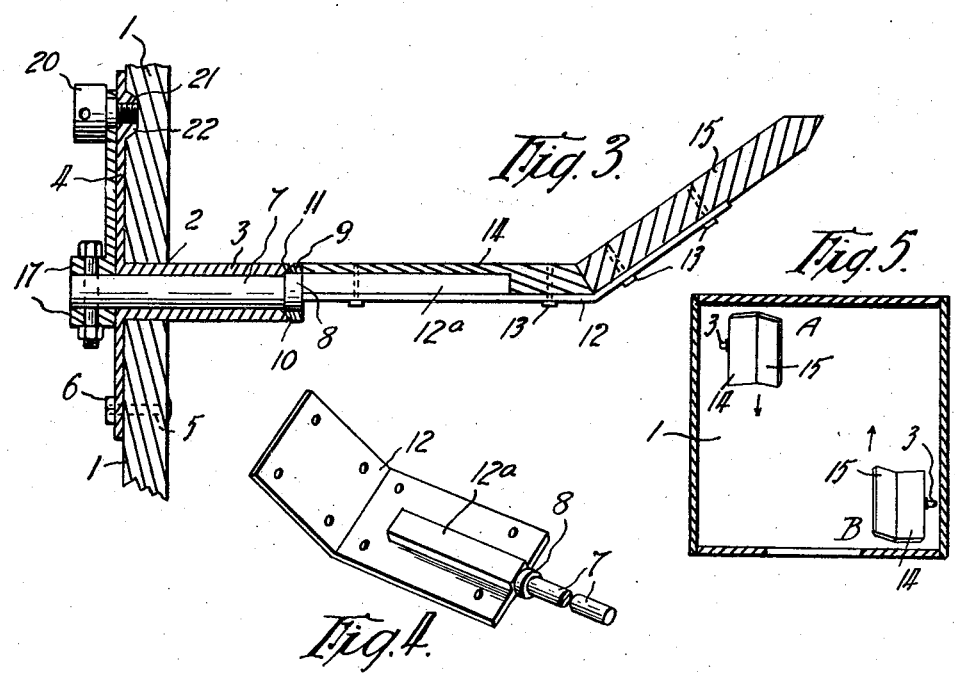
Inventors:
Joseph O'Connell,
Harold N. Kerr,
By [signature]
Atty Patented Aug. 4, 1931

1,817,833

UNITED STATES PATENT OFFICE

JOSEPH O'CONNELL AND HAROLD HAMILTON KERR, OF KENSINGTON, VICTORIA, AUSTRALIA

CHURN

Application filed December 17, 1927, Serial No. 240,890, and in Australia January 24, 1927.

This invention has been devised to provide an element for catching, gathering, conveying, directing and depositing the butter at a point during its movement whilst the working, kneading or blending operations are being carried out within a churn barrel having a rotary motion.

During the manufacture of butter i. e. treatment within a rotary churn, the butter is washed and salted, and worked by the usual groove and parallel working elements operating within the churn, and during such blending process it has been found that portions of the butter receive varying treatment i. e. different proportions of salt and water and pressure of the workers, the result that the composition of the butter when finished was not of uniform character.

Our invention has been devised to overcome the foregoing disadvantages by providing an element of the class set forth adjustable to any angle required, any number of elements may be employed, and their construction and arrangement and angle of adjustment ensures that a thorough working, kneading or blending of the butter by the workers takes place so as to provide a mixture of the constituents to form a uniform composition when finished; furthermore the adjustment permits the element or elements to be set at an angle to offer the least possible resistance to the cream during churning operations thereof.

In describing our invention we shall refer to the employment of two elements of the type referred to.

In order that our invention may be the more easily understood, reference will be made to the accompanying sheet of drawings in which—

Figure 1 is a front view of a churn barrel with the front wall removed, the elements being shown set for catching, gathering, conveying, directing and depositing the butter to the front and rear of the churn barrel.

Figure 2 is an enlarged view of the adjusting and locking apparatus hereinafter referred to.

Figure 3 illustrates in section and drawn to a large scale an element of the class set forth and its setting and locking apparatus.

Figure 4 is a view of angular plate and spindle of the element whilst—

Figure 5 illustrates drawn to a small scale a sectional plan view of a churn barrel with parts removed for sake of clearness, the elements being set as illustrated in Figure 1.

At desired positions in the barrel 1 of the churn preferably adjacent to the front and rear holes 2 are provided and through each hole is inserted a bearing 3 with a plate 4 placed on and fixed to the exterior of the churn barrel 1 in any suitable manner preferably by bolts 5 with nuts 6, the said bearing 3 when in position projects for some distance within the churn barrel 1 and carries a spindle 7 with collar 8 encircled by a packing gland 9 whose tapered edge 10 engages the tapered mouth 11 of the bearing, thus preventing the entry of any liquid into the bearing 3, integral with the spindle is a flat angular plate 12 with strengthening block 12$^a$, the said plate 12 and block 12$^a$ is disposed and fixed preferably by bolts 13 in a recess in flat wooden members 14 and 15 forming the contact medium with the butter, the outer edge of 15 is beveled to facilitate its entry into a body of butter that it may come into contact with during the rotation of the churn barrel when gathering butter. Mounted and held on the exterior end of the spindle 7 by bolts 16 are clamping members 17, an integral adjustable quadrant 18 which forms means for adjusting the angle or position of the angular shaped element before referred to. The adjustment is accomplished by providing a number of holes 19 in the quadrant 18 through which a set screw 20 is passed to engage a threaded hole 21 furnished in the enlarged portion 22 of the plate 4 fixed to the exterior of the churn barrel.

As before stated in this instance reference will be made to the employment of two of the elements referred to, and from the above description of same it will be seen that with the set screw 20 free, and by turning the quadrant 18 for the desired extent, the respective element is simultaneously turned to assume and rest at the required angle or incline to the longitudinal axis of the barrel, whereupon the set screw is inserted through the respective hole 19 in the quadrant 18 and engages by screwing it in the threaded hole 21 of the plate 4. The churn, as shown in Fig. 1 comprises a plurality of butter workers preferably consisting of corrugated rolls 21 arranged in pairs and extending longitudinally of the drum in parallel relation to the axis of the latter. Figures 1 and 5 illustrate each of the elements A, B set at an angle so that as the churn revolves butter as it falls from the respective workers 21 will drop on to each element, and as the churn barrel rotates, the elements at A positioned adjacent to the rear of the churn barrel will catch and direct the butter to the front of the churn, and the other or second element at B positioned at the front of the churn barrel will catch the butter as it falls from the workers 21 and direct butter to the rear of the churn. As the churn rotates any body of butter that an element may come into contact with will be severed and part or in some instances the whole body will be gathered up by the respective element, and as the churn continues to rotate the element will take the necessary angle or incline to cause the butter to slide from the element, during which action it will be directed where required.

We claim

1. In a rotary churn, the combination of a horizontal rotary drum, butter working members mounted in and extending longitudinally of the drum in parallel relation to the axis of the latter, and a straight butter receiving plate angular in cross section mounted in the drum near each end thereof in fixed relation to the working members and inclined in opposite directions relative to said axis whereby said plates upon rotation of the drum receive butter from said members and move it longitudinally of the drum in opposite directions.

2. In a churn, the combination of a horizontal rotary drum, butter working members mounted in the drum adjacent the periphery thereof and extending parallel to the axis of the drum, and a straight shallow trough-like butter receiving plate mounted in the drum near each end thereof in fixed relation to the working members and inclined in opposite directions relative to said axis, whereby said plates upon rotation of the drums receive butter from said members and move it longitudinally in opposite directions.

3. In a rotary churn, the combination of a horizontal rotary drum, butter working members mounted in and extending longitudinally of the drum in parallel relation to the axis of the latter, an inwardly directed spindle mounted in the periphery of the drum near each end of the latter, and a straight shallow trough-like butter receiving plate mounted on each spindle in fixed relation to said working members and inclined in opposite directions relative to said axis, whereby said plates upon rotation of the drum move the contents of the latter longitudinally thereof in opposite directions.

In testimony whereof we have signed our names to this specification.

JOSEPH O'CONNELL.
HAROLD HAMILTON KERR.